(12) United States Patent
Schwagerman et al.

(10) Patent No.: US 7,997,795 B2
(45) Date of Patent: Aug. 16, 2011

(54) TEMPERATURE SENSORS AND METHODS OF MANUFACTURE THEREOF

(75) Inventors: William H Schwagerman, McHenry, IL (US); Robert K Frake, Wonderlake, IL (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 166 days.

(21) Appl. No.: 11/416,330

(22) Filed: May 2, 2006

(65) Prior Publication Data

US 2007/0258506 A1 Nov. 8, 2007

(51) Int. Cl.
*G01K 7/02* (2006.01)

(52) U.S. Cl. ........ 374/179; 374/163; 374/183; 374/208; 136/200

(58) Field of Classification Search .......... 374/163, 374/179, 183, 185, 208; 338/25, 28, 22 R; 73/866.5; 136/200
See application file for complete search history.

(56) References Cited

U.S. PATENT DOCUMENTS

| | | | | |
|---|---|---|---|---|
| 3,232,794 A * | 2/1966 | Korton | ............ | 136/233 |
| 3,738,173 A * | 6/1973 | Sato | ............ | 374/158 |
| 3,897,272 A * | 7/1975 | Medlar | ............ | 136/230 |
| 4,166,451 A * | 9/1979 | Salera | ............ | 600/549 |
| 4,450,315 A * | 5/1984 | Waterman | ............ | 136/230 |
| 4,778,537 A | 10/1988 | Thom et al. | | |
| 4,934,831 A * | 6/1990 | Volbrecht | ............ | 374/183 |
| 4,937,552 A | 6/1990 | Lam | | |
| 4,987,749 A * | 1/1991 | Baier | ............ | 62/222 |
| 5,037,488 A | 8/1991 | Wienand | | |
| 5,046,857 A * | 9/1991 | Metzger et al. | ............ | 374/135 |
| 5,131,759 A | 7/1992 | Eiermann et al. | | |
| 5,161,894 A * | 11/1992 | Bourigault | ............ | 374/185 |
| 5,197,805 A * | 3/1993 | Wilson | ............ | 374/208 |
| 5,209,571 A | 5/1993 | Kendall | | |
| 5,464,485 A * | 11/1995 | Hall, Jr. | ............ | 136/230 |
| 5,749,656 A * | 5/1998 | Boehm et al. | ............ | 374/185 |
| 5,999,081 A * | 12/1999 | Hannigan et al. | ............ | 338/28 |
| 6,130,598 A | 10/2000 | Katsuki et al. | | |
| 6,164,819 A | 12/2000 | Moriwake et al. | | |
| 6,272,735 B1 | 8/2001 | Moriwake et al. | | |
| 6,466,123 B1 * | 10/2002 | Kuzuoka et al. | ............ | 338/25 |
| 6,501,366 B2 | 12/2002 | Takahashi et al. | | |
| 6,536,950 B1 * | 3/2003 | Green et al. | ............ | 374/179 |
| 6,568,849 B1 | 5/2003 | Chen et al. | | |
| 6,639,505 B2 * | 10/2003 | Murata et al. | ............ | 338/25 |
| 6,762,671 B2 | 7/2004 | Nelson | | |
| 6,829,820 B2 | 12/2004 | Adachi et al. | | |
| 6,830,374 B1 | 12/2004 | Gray | | |
| 6,854,882 B2 | 2/2005 | Chen | | |
| 6,880,969 B2 | 4/2005 | Adachi et al. | | |
| 6,899,457 B2 * | 5/2005 | Kurano | ............ | 374/185 |
| 7,004,626 B1 * | 2/2006 | Giberson et al. | ............ | 374/179 |
| 7,621,672 B2 * | 11/2009 | Ripley | ............ | 374/208 |
| 2002/0006155 A1 | 1/2002 | Wienand et al. | | |
| 2002/0090019 A1 | 7/2002 | Marto et al. | | |
| 2002/0125417 A1 | 9/2002 | Damaschke | | |
| 2002/0136263 A1 | 9/2002 | Wilkins | | |
| 2002/0172258 A1 * | 11/2002 | Adachi et al. | ............ | 374/185 |
| 2003/0067960 A1 * | 4/2003 | Nyffenegger et al. | ............ | 374/143 |
| 2003/0072352 A1 | 4/2003 | Muziol | | |
| 2003/0081652 A1 | 5/2003 | Wienand et al. | | |
| 2004/0218662 A1 | 11/2004 | Hanzawa et al. | | |
| 2004/0227636 A1 | 11/2004 | Gul | | |
| 2005/0117626 A1 * | 6/2005 | Kobayashi et al. | ............ | 374/163 |
| 2005/0157775 A1 | 7/2005 | Chapman | | |
| 2009/0296781 A1 * | 12/2009 | Weber et al. | ............ | 374/185 |

\* cited by examiner

*Primary Examiner* — Gail Verbitsky

(74) *Attorney, Agent, or Firm* — Brinks Hofer Gilson & Lione

(57) ABSTRACT

Temperature sensors and methods of manufacturing thereof, having an intermediate stop disposed along a set of wires, the intermediate stop is secured to the set of wires such that an insulator can be properly positioned around proximal end portions of the set of wires during assembly of the temperature sensor.

36 Claims, 12 Drawing Sheets

Section B-B

Section C-C

Section D-D

Section E-E

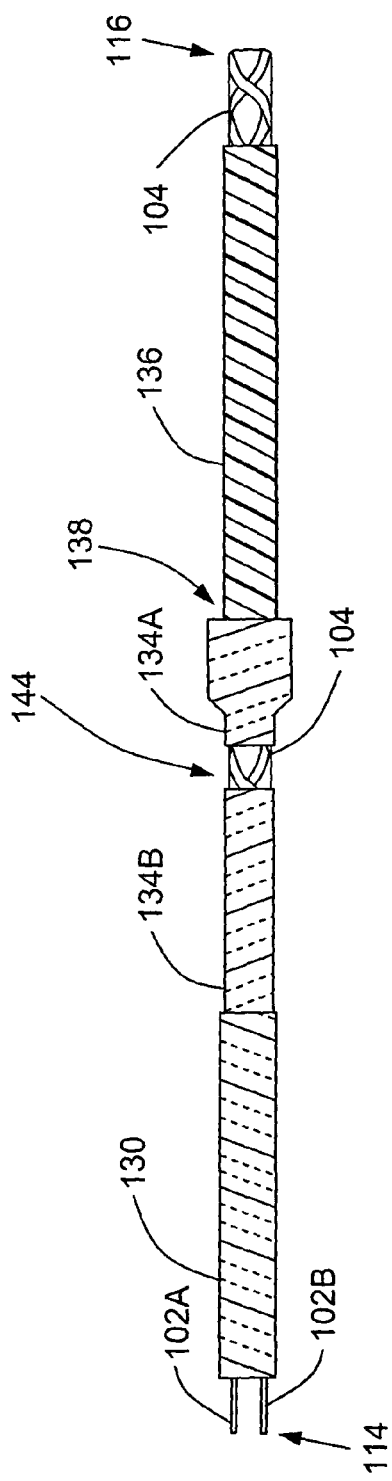
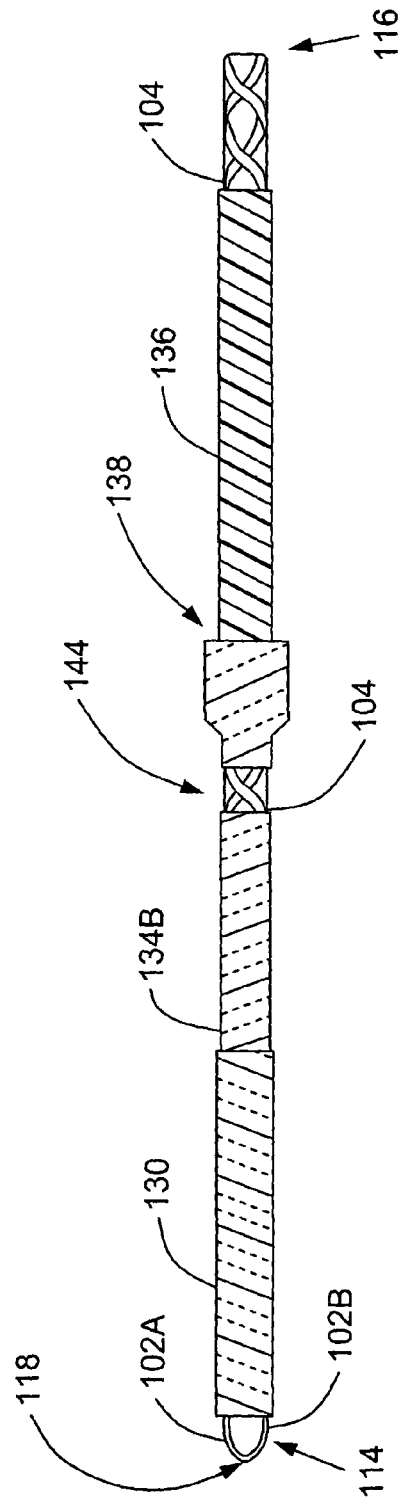
FIG. 6G
FIG. 6H

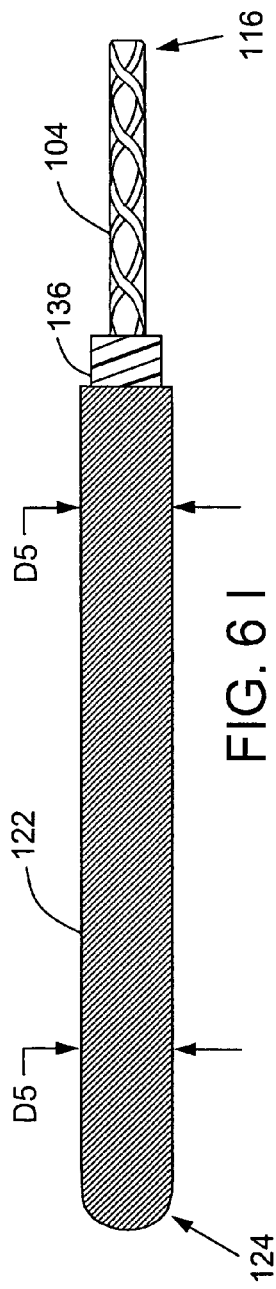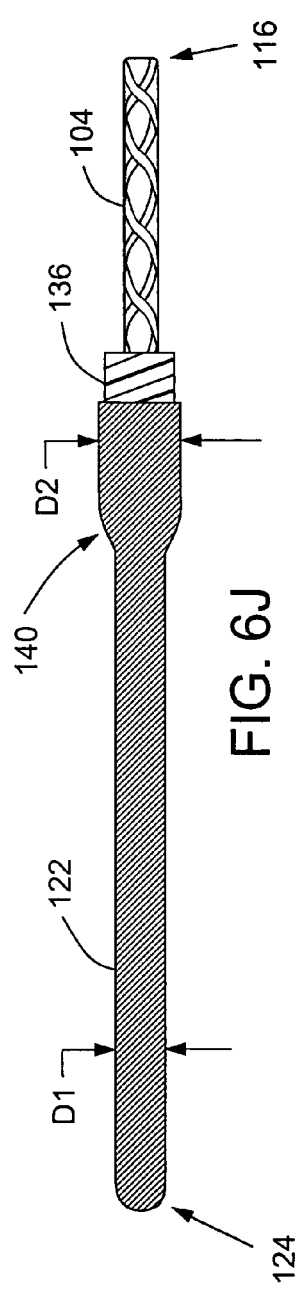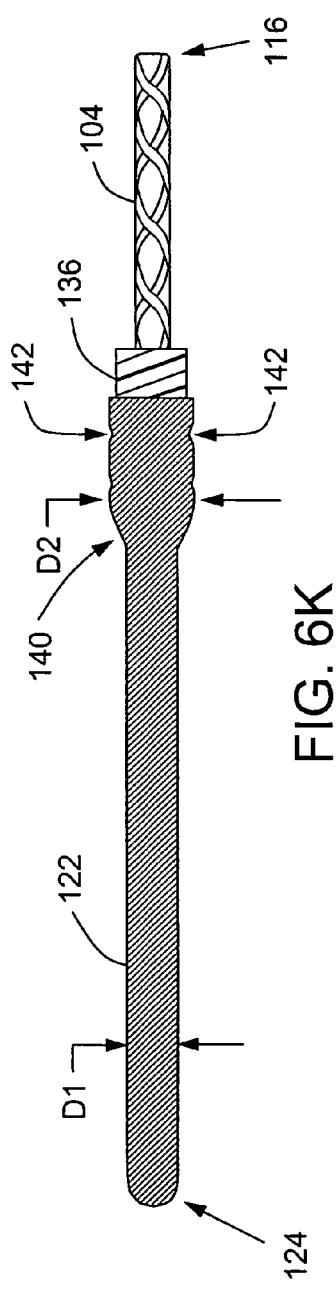

TEMPERATURE SENSORS AND METHODS OF MANUFACTURE THEREOF

FIELD

The invention relates generally to temperature sensors and, more particularly, to temperature sensors and methods of manufacturing temperature sensors.

BACKGROUND

The statements in this section merely provide background information related to the present disclosure and may not constitute prior art.

Commonly used temperature sensors include temperature sensing elements such as thermocouples, resistive temperature devices (RTDs), thermistors, diode sensors, and transistor temperature sensors that are packaged within protective sheaths, such as metal tubes. For example, in a temperature sensor utilizing a thermocouple, the thermocouple includes a junction formed by two conductors of dissimilar materials contained within a temperature sensing end of the sheath. The two conductors extend through a protective sheath and are connected to a remote temperature reading device. The thermocouple and conductors are held in place by protective and/or mounting material and, at least partially, isolated from the sheath. However, due to the nature of the protective and/or mounting material, the temperature sensors are often delicate and susceptible to breakage and/or failure.

Various attempts have been made to provide a robust configuration for temperature sensors that are both durable and cost-effective to manufacture. One common temperature sensor is manufactured by hard firing an insulator. The conductor wires are then slid inside the hard fired insulators and the subassembly is then slid into a metal sheath. Insulating powders may also be included within the voids of this assembly. This method produces a temperature sensor that has a hard brittle ceramic insulator that cannot be bent and is susceptible to damage from vibration or impact. Additionally, the process of inserting and firing the insulating power can be time consuming and costly.

Other methods by which temperature sensors are manufactured include a preformed crushable ceramic insulator disposed around the conductors before the sheath is assembled. The conductors are placed inside the preformed crushable insulator and the insulator with conductors are placed into a metal sheath having two open ends with the temperature sensing element being located near one end of the sheath. Thereafter, a portion or all of the sheath is swaged to reduce the outer diameter to form a narrowed portion, thereby compacting the crushable ceramic insulator into a compacted crushed powder around the conductors. As a result, the conductors are held in place by the crushed and compacted ceramic powder with the sensing element remaining in an open un-insulated inner space defined by the narrowed portion. After the sheath is swaged, a ceramic insulating powder is introduced through the open end with the sensing element, is packed around the sensing element, and then that open end of the sheath is closed about the sensing element. However, the ceramic insulating powder can often be loosely distributed around portions of the conductors and the thermocouple and does not provide an effective barrier to moisture for the temperature sensing element.

In a similar manner, the sensing element and conductors can be placed into a metal sheath having one closed end and one open end with the sensing element being located within the closed end. In this case, the sensing element often is not encased and is positioned within a void within the closed end.

Each of these existing manufacturing methods are time consuming and result in a higher cost for the manufactured temperature sensors. Additionally, due to the brittle nature of the fired ceramic powder, temperature sensors manufactured according to existing practice are susceptible to damage and premature failure.

SUMMARY

The inventor has succeeded at designing an improved temperature sensor.

According to one aspect of this disclosure, a temperature sensor includes an intermediate stop disposed along a set of wires with the intermediate stop being secured to the set of wires such that an insulator can be properly positioned around proximal end portions of the set of wires during assembly of the temperature sensor.

According to another aspect, a temperature sensor includes a first wire having a proximal end portion defining a proximal end, a distal end portion, an intermediate portion, and a covering, and a second wire having a proximal end portion defining a proximal end, a distal end portion defining a proximal end, an intermediate portion, and a covering. A junction is disposed at the proximal ends of the first and second wires and an insulator surrounds a portion of the proximal end portions of the first and second wires. A sleeving surrounds at least a portion of the intermediate portions of the first and second wires. An insulating material surrounds the first and second wires between the insulator and the sleeving and a sheath is disposed around the proximal ends of the first and second wires, the insulator, the insulating material, and at least a portion of the sleeving.

According to yet another aspect, a temperature sensor assembly having a thermocouple formed by an end of a first wire and an end of a second wire includes means for insulating non-insulated portions of the first and second wires proximate to the thermocouple, means for insulating first insulated portions of the first and second wires adjacent to the means for insulating the non-insulated portions, means for insulating second insulated portions of the first and second wires adjacent to the means for insulating the first insulated portion. Also included is a sheath that has a closed end and an open end. The sheath surrounds the means for insulating non-insulated portion, the means for insulating the first insulated portions, and at least a portion of the means for insulating the second insulated portions. The sheath includes means for securing the means for insulating the second insulated portions within the sheath and means for securing the means for insulating non-insulated portions within the sheath.

According to still another aspect, a method of manufacturing a temperature sensor having a first wire and a second wire includes stripping a portion of a covering from a proximal end portion of the first and second wires to define insulated distal end portions and stripped proximal end portions. The method also includes sliding a sleeving over at least a portion of the insulated distal end portions of the first and second wires, applying an insulating material around at least a portion of the insulated distal end portions of the first and second wires, and sliding an insulator over the stripped proximal end portions of the first and second wires and against the insulating material. The method further includes forming a junction at ends of the stripped proximal end portions of the first and second wires, sliding a sheath over the insulator, the insulating material, and at least a portion of the sleeving, and reducing an outer dimension of at least a portion of the sheath.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

FIGS. 6A-6K are stages of assembly of temperature sensors according to some exemplary methods of manufacturing utilizing parts as illustrated in FIG. 5.

It should be understood that throughout the drawings, corresponding reference numerals indicate like or corresponding parts and features.

DETAILED DESCRIPTION

The following description is merely exemplary in nature and is not intended to limit the present disclosure or the disclosure's applications or uses.

Figure 1:
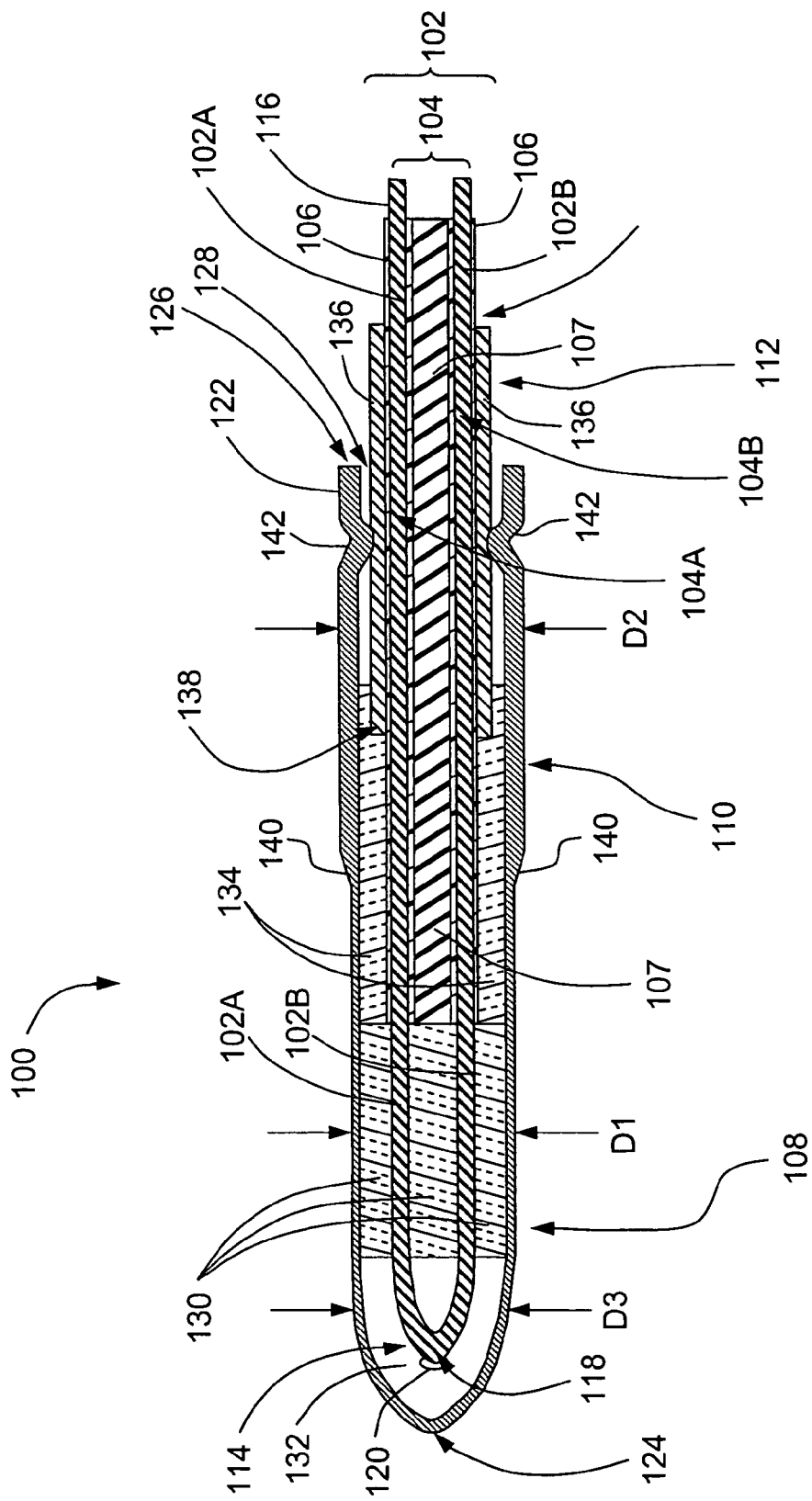
FIG. 1 is a full section view of a temperature sensor according to a first exemplary embodiment and constructed in accordance with the teaching of the present disclosure.

Referring to FIG. 1, a temperature sensor in accordance with one exemplary embodiment and generally indicated by reference numeral 100 is illustrated. The temperature sensor 100 includes a set of wires 102 (or referred hereinafter as a wire set 102 or individually as a wire 102 such as wire 102A and wire 102B) having a first wire 102A and a second wire 102B. While the wire set 102 is illustrated as two wires 102A and 102B, more than two wires 102A and 102B may also be provided while remaining within the scope of the present disclosure. Each wire of wire set 102 generally includes a conductor 104 (shown as first conductor 104A and second conductor 104B) having covering 106. The wires 102 can be of any type of conducting material and can include materials such as nickel, "Alloy X," "Alloy 600," and/or platinum, by way of example. Additionally, the wires 102 can be solid or stranded. The conductors 104 may be of the same material or dissimilar materials depending on the particular temperature sensing application and type of temperature sensing element utilized. In addition to the coverings 106 of each conductor 104, an wire set overcoat 107 that surrounds the conductors 104 and the coverings 106 binds the conductors 104A and 104B together. The covering 106 can be of any type of insulating and/or protective material and in one embodiment is a polyimide.

The wire set 102 includes a proximal end portion 108, an intermediate portion 110, and a distal end portion 112. The proximal end portion 108 defines a proximal end 114 and the distal end portion 112 defines a distal end 116.

In one form, two or more of the wires of the wire set 102 are coupled to form a junction 118 at the proximal end 114. The junction 118 preferably forms or is associated with a temperature sensing element 120. In some embodiments, the temperature sensing element 120 is of any type of element capable of generating an electrical signal (not shown) that is indicative of a measured temperature. For example, in one embodiment, the temperature sensing element 120 is a thermocouple (illustrated in FIG. 1 as a bead 120) formed by the junction of two conductors 104A and 104B, or can include a resistance temperature detector (not shown), or a thermistor, by way of example. In the exemplary embodiment of a thermocouple as the temperature sensing element 120, the junction 118 includes an exposed junction, a grounded junction, or an ungrounded junction. An exposed junction is often utilized where a hot, or measuring, junction protrudes beyond the probe's sheath 122 or protective material so as to be fully exposed to the substance or environment being measured. Electrical isolation is not provided on an exposed junction. A grounded junction is formed where a hot, or measuring junction, is an integral part of the sheath 122 or the sheath material protecting the temperature sensor 100. Generally, electrical isolation is not provided on a grounded junction. An ungrounded junction is formed when the thermocouple junction is electrically insulated from its surroundings including the sheath 122 or other protective material of the temperature sensor 100. This is also referred to as an insulated junction thermocouple by those skilled in the art. Generally, the temperature sensor 100 described herein can utilize any of these types of thermocouple junction configurations.

In operation, the wire set 102 receives signals at the proximal end 114 as provided by the temperature sensing element 120. The signals are delivered through the wire set 102 to the distal end 116, which is configured for direct or indirect attachment to a temperature sensing instrument (not shown). Based on the provided signals. the instrument can determine the temperature at the junction 118.

As shown in one form of the disclosure, the sheath 122 encloses the wire set 102 and the junction 118, along with any temperature sensing element, e.g., 120, that is present. The sheath 122 includes a closed end 124 that encloses the proximal end 114 of the wire set 102 and an open end 126 defining a cavity 128 that enables the distal end portions 112 of the wire set 102 to exit the sheath 122. The sheath 122 can be of any suitable material for a desired application of the temperature sensor 100 for sensing temperature, and may include, in some preferred embodiments, a metal such as stainless steel, by way of example.

An insulator 130 is positioned about the wire set 102 along a portion associated with the proximal end portion 108 and, in some cases, is proximate to the proximal end 114. While not shown in FIG. 1, in some embodiments, the insulator 130 can be positioned about the junction 118 and the temperature sensing element 120 and fill a space 132 defined by the closed end 124. In other embodiments, the space 132 is void of the insulator 130 or is filled with another insulating material such as an insulating powder (not shown in FIG. 1).

The insulator 130 is preferably a thermal and/or an electrical insulating material such as magnesium oxide, silicon oxide, and aluminum oxide, by way of example. In some embodiments, the insulator 130 is a compressed powder insulating material. In one embodiment, the insulator 130 is a compactable preform that had been compacted about the proximal end portion 108 of wire set 102 and secured in a compacted manner by the sheath 122. In one preferred embodiment, the covering 106 around the conductors 104 of the wire set 102 are stripped near the proximal end 114 and about equivalent to the proximal end portion 108. In this manner, only the wires 102 are placed within the compactable preform of insulator 130, the compacted insulator 130 is formed directly against the conductors 104 and does not include the coverings 106.

As further shown, one or more insulating material 134 is positioned around the conductors 104 and adjacent to the insulator 130. The insulating material 134 is preferably secured and/or compressed about the conductors 104 by the sheath 122 such that the insulator 130 is properly positioned during assembly of the temperature sensor 100, which is described in greater detail below. The insulating material 134 is positioned as an intermediate stop against the insulator 130. The insulating material 134 can be made of any material and in some embodiments is a polyimide such as Kapton®, by way of example. (Kapton is a U.S. registered trademark of DuPont Corporation). In one preferred embodiment, the insulating material 134 is a tape, such as a polyimide tape, that has been wrapped around the conductors 104. In some embodiments, the insulating material 134, the covering 106, and the sheath 122 act together as a vapor barrier impeding the passage of water vapor or humidity from passing through and contacting the insulator 130 and proximal end 114 of the conductors 104. Generally, the portion of the conductors 104 surrounded by the insulating material 134 includes the covering 106 as shown.

Figure 3:
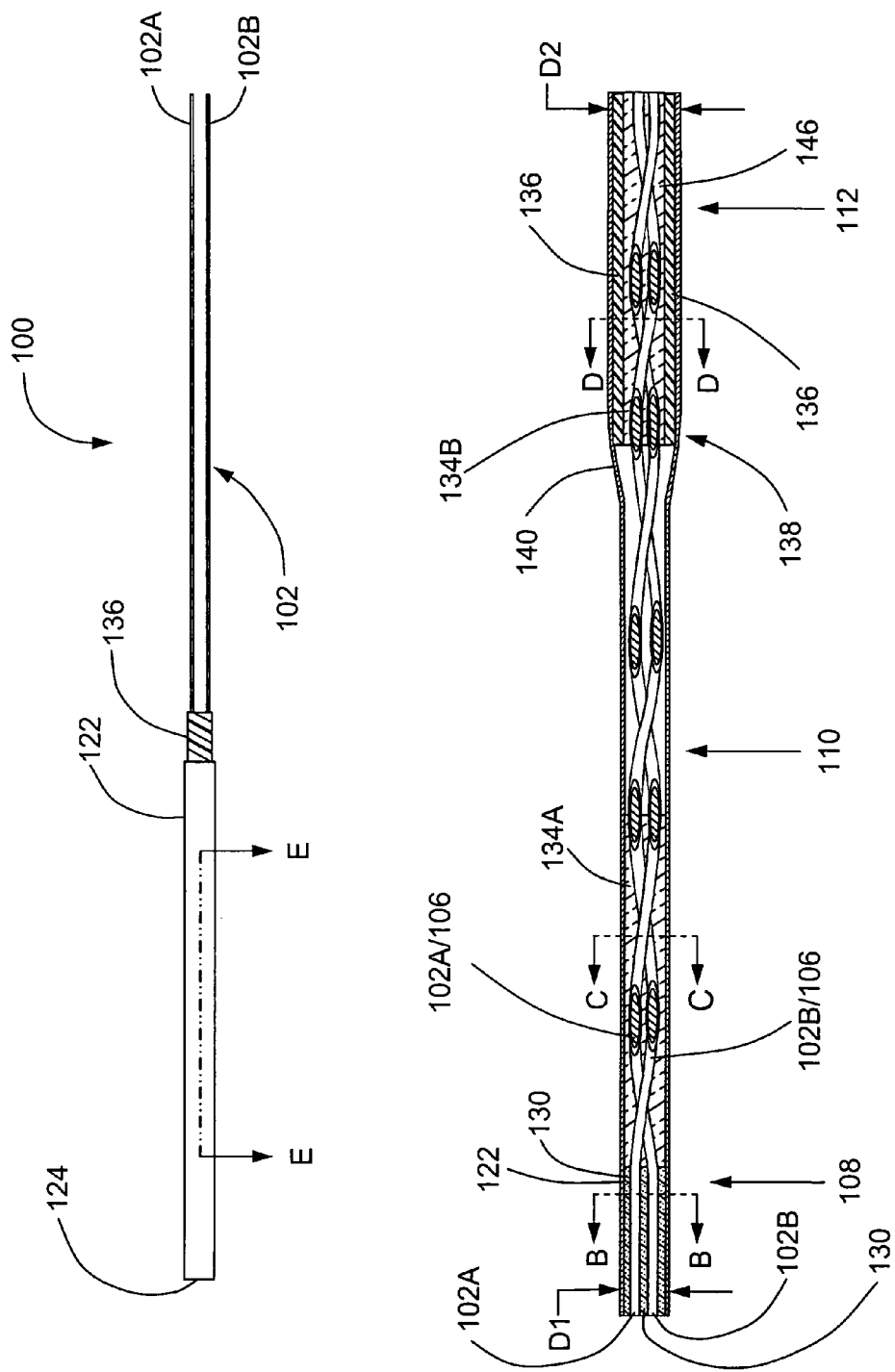
FIG. 3 is full section view of a temperature sensor according another exemplary embodiment.

As noted, while not shown in FIG. 1, more than one insulating material 134 may be present. See FIG. 3 and the related description below. For example, a first insulating material 134 can be positioned proximate to the insulator 130 and a second insulating material (not shown) also surrounding the wire set 102 is positioned next to and spaced apart from the first insulating material and thereby forming a space or gap therebetween, as shown in FIG. 3 and discussed below.

A sleeving 136 surrounds the wire set 102 adjacent to the insulating material 134 on a portion opposite of the insulator 130, proximate to the distal end portion 112 of the conductors 104. In some embodiments, an overlapping portion 138 of the insulating material 134 is positioned over a portion of the sleeving 136, as shown. The sleeving 136 can also be positioned wholly within the cavity 128 as defined by sheath 122 or a portion can be about the conductors 104 that extends outside of the sheath 122. In the latter case, the sleeving acts, at least in part, as a strain relief for the conductors 104. The sleeving 136 may be of any type of material and may include a flexible material. For example, the sleeving 136 can include a braided insulating material such as fiberglass, nylon, Teflon® (Teflon is a U.S. registered trademark of DuPont Corporation), plastic, or composite.

The sheath 122 can have any shape. In one embodiment, the sheath 122 includes a first outer dimension D1 and a second outer dimension D2. As shown by example, the sheath 122 is cylindrical, but may be of another shape. The first outer dimension D1 is generally associated with a portion of the proximal end portion 108 and can include the intermediate portion 110, or any portion thereof. The second outer dimension D2 is generally associated with the open end 126 of the sheath 122 and can be equal to or greater than the first outer dimension D1. In the embodiments with second outer dimension D2 being greater than the first outer dimension D1, a transition portion 140 is defined therebetween and having a variety of outer dimensions that transition from the smaller first outer dimension D1 to the larger second outer dimension D2. The second outer dimension D2 may include a portion of the sheath 122 surrounding the sleeving 136 and at least a portion surrounding the insulating material 134. The sheath 122 may include one or more dimension reductions 142, such as through denting, crimping, swaging, dimpling, or rolling, by way of examples, that reduce at least a portion of the second outer dimension D2. The dimension reductions 142 are positioned and dimensioned to at least partially secure the sleeving 136 and/or conductors 104 within the cavity 128 of the sheath 122.

In some embodiments, the sheath 122 includes a tip that is tapered through a third outer dimension D3 proximate to the closed end 124. Generally, the third outer diameter D3 is less than the first outer dimension D1 and is reduced to define the closed end 124. While not shown in FIG. 1, in other embodiments, the sheath 122 has a substantially constant outer dimension.

Figure 2A:
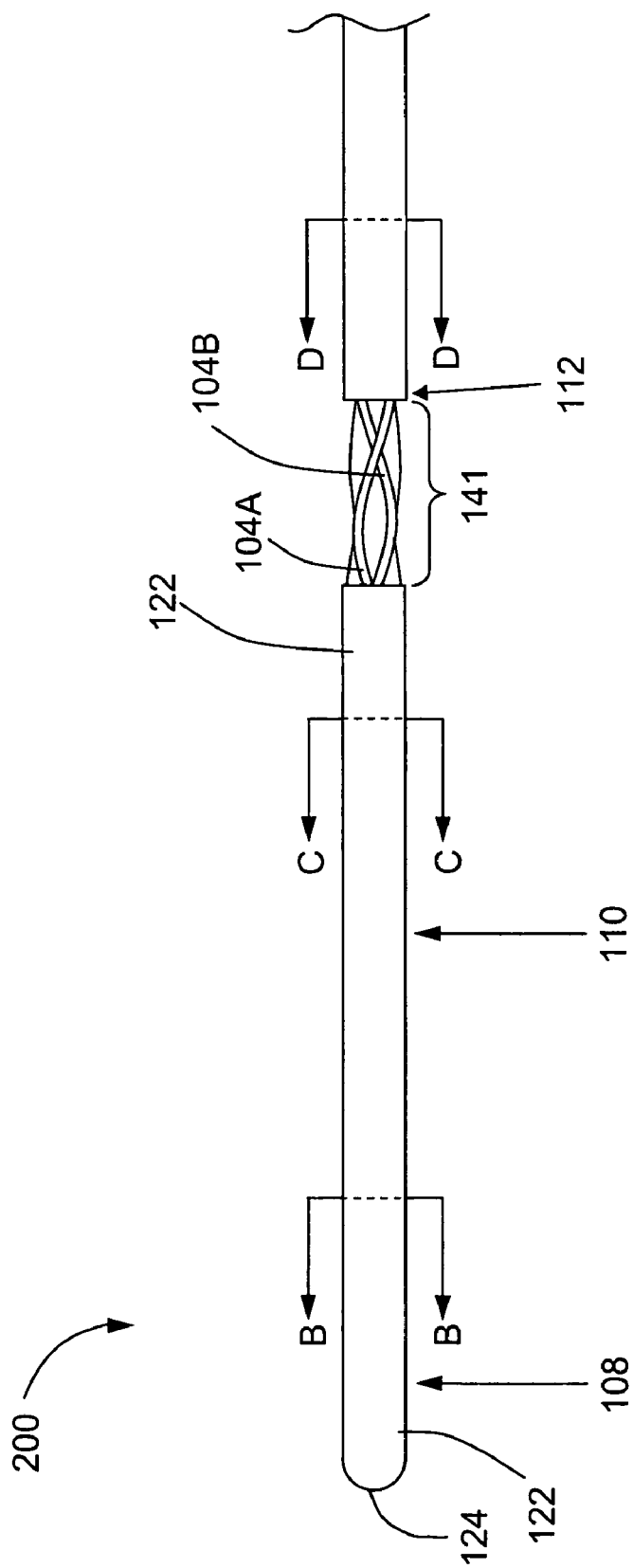
FIG. 2A is a side cutaway view of another exemplary temperature sensor according to the present disclosure.

FIGS. 2A-D illustrate yet another exemplary embodiment of a temperature sensor according to the present disclosure. FIG. 2A illustrates a temperature sensor 200 having a sheath 122 with closed end 124. As shown in cutaway portion 141, the pair of conductors 104A and 104B are twisted inside the sheath 122.

Figure 2B:
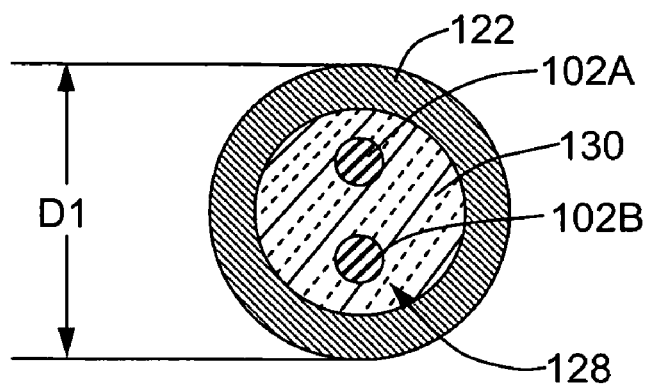
FIG. 2B is a cross-sectional view of the exemplary temperature sensor of FIG. 2A taken along line B-B.

In FIG. 2B, at one position within the proximal end portion 108, the two wires 102A and 102B of wires set 102 are surrounded by the insulator 130. The two conductors 104A and 104B preferably do not include coverings 106 within this portion of the sheath 122. The sheath 122 surrounds the insulator 130 that is positioned with the sheath cavity 128. The sheath 122 in this portion has an outer dimension D1. The sheath 122 preferably surrounds the insulator 130 and wires 102A and 102B such that spaces and/or air gaps are minimized and/or eliminated within this portion of the sheath cavity 128.

Figure 2C:
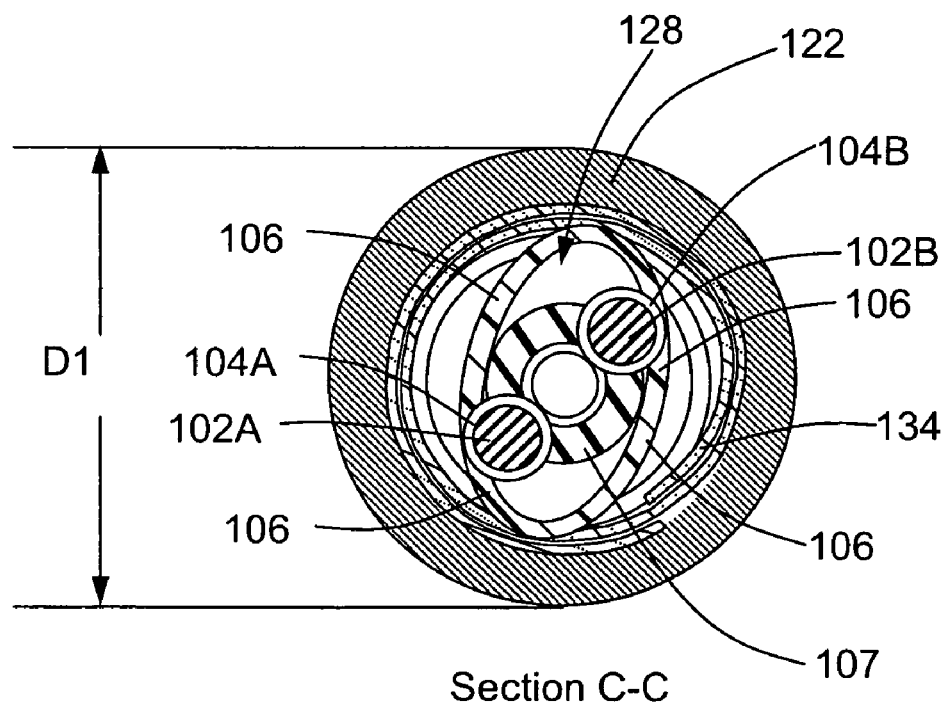
FIG. 2C is a cross-sectional view of the exemplary temperature sensor of FIG. 2A taken along line C-C.

In the intermediate portion 110, as shown in FIG. 2C, the two wires 102A and 102B include conductors 104A and 104B which are each surrounded by covering 106. The two wires 102A and 102B are shown as being twisted as described above attached together by wire set overcoat 107. The wires 102A and 102B are surrounded by insulating material 134 within the sheath cavity 128. The sheath 122 encloses the insulating material 134 and the wires 102A and 102B within the sheath cavity 128 such as to also minimize and or eliminate spaces and/or air gaps within this portion of the sheath cavity 128. The sheath 122 at this position of temperature sensor 200 also has outer dimension D1.

Figure 2D:
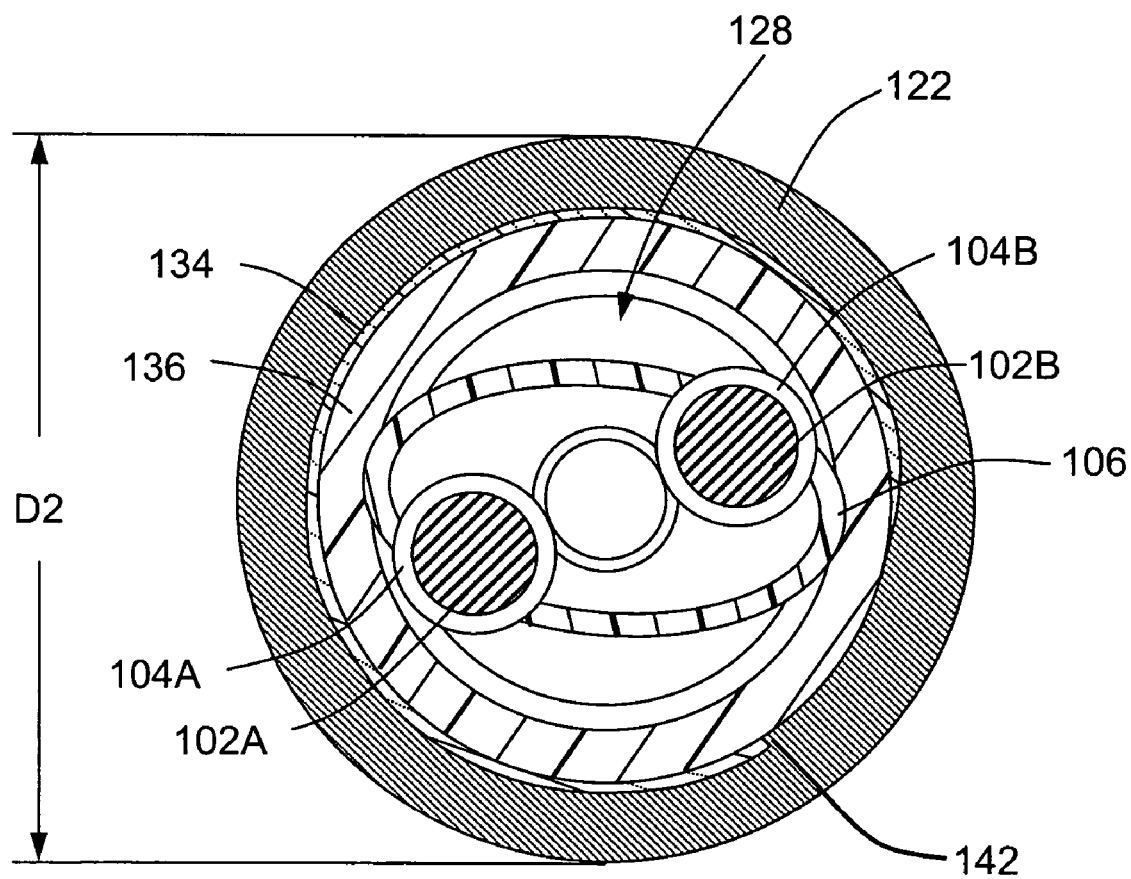
FIG. 2D is a cross-sectional view of the exemplary temperature sensor of FIG. 2A taken along line D-D.

As shown in FIG. 2D, the two wires 102A and 102B include conductors 104A and 104B and the surrounded by covering 106. The two wires 102A and 102B are also shown as being longitudinally twisted and are coupled together by wire set overcoat 107. The wires 102A and 102B are surrounded by sleeving 136 that is surrounded by insulating material 134. The sheath 122 encloses the sleeving 136, insulating material 134, and the wires 102A and 102B within the sheath cavity 128. In this cross-section, one or more air gap spaces 146 may be present within the sheath cavity 128. In this embodiment, the sheath 122 at cross-section D-D has an outer dimension D5 that is preferably greater than or equal to the first outer dimension D1. Of course in other embodiments, it may be less.

Referring now to FIG. 3, the wires 102A and 102B and conductors 104A and 104B within the proximal end portion 108 are surrounded by the insulator 130 and are generally straight. The wires 102A and 102B within the intermediate portion 110 are twisted about each other within the intermediate portion 110 and into and through the distal end portion 112.

In the embodiment of FIG. 3, another embodiment of this disclosure is illustrated. As discussed above, the insulating material 134 can include one or more portions of insulating material 134. In this exemplary embodiment, a first insulating material 134A is positioned adjacent to the insulator 130 and the second insulating material 134B is positioned adjacent to the sleeving 136 and overlaps a portion of the sleeving 136 at the overlapping portion 138. The second insulating material 134B is positioned apart from the first insulating material 134A to form an insulating gap 144 longitudinally between the first and second insulating materials 134A and 134B, respectively. The insulating gap 144 can provide for improved isolation within the sheath cavity 128 as well as for cost reductions in manufacturing by reducing the material costs and ease of process, e.g., placement of tape insulating material 134 holds the sleeving 136 and/or the insulator 130 in a desirable position during manufacturing.

As described by the various exemplary embodiments above, in some embodiments of the disclosure, a temperature sensor includes an intermediate stop disposed along a set of wires, the intermediate stop is secured to the set of wires such that an insulator can be properly positioned around proximal end portions of the set of wires during assembly of the temperature sensor.

In some other embodiments, a temperature sensor includes a first wire having a proximal end portion defining a proximal end, a distal end portion, an intermediate portion, and a covering, and a second wire having a proximal end portion defining a proximal end, a distal end portion defining a proximal end, an intermediate portion, and a covering. The first wire and the second wire form the set of wires as discussed above. A junction is disposed at the proximal ends of the first and second wires and an insulator surrounds a portion of the proximal end portions of the first and second wires. The junction forms a thermocouple or, in some other embodiments, a coupling to a discreet temperature sensor such as a thermistor or resistance temperature detector (RTD). A sleeving surrounds at least a portion of the intermediate portions of the first and second wires. An insulating material surrounds the first and second wires between the insulator and the sleeving and a sheath is disposed around the proximal ends of the first and second wires, the insulator, the insulating material, and at least a portion of the sleeving.

Other variations of the embodiments of temperature sensors 100, 200 are also considered to be within the scope of the current invention and not limited to the exemplary embodiments described in the figures and in the description of the figures.

Figure 4:
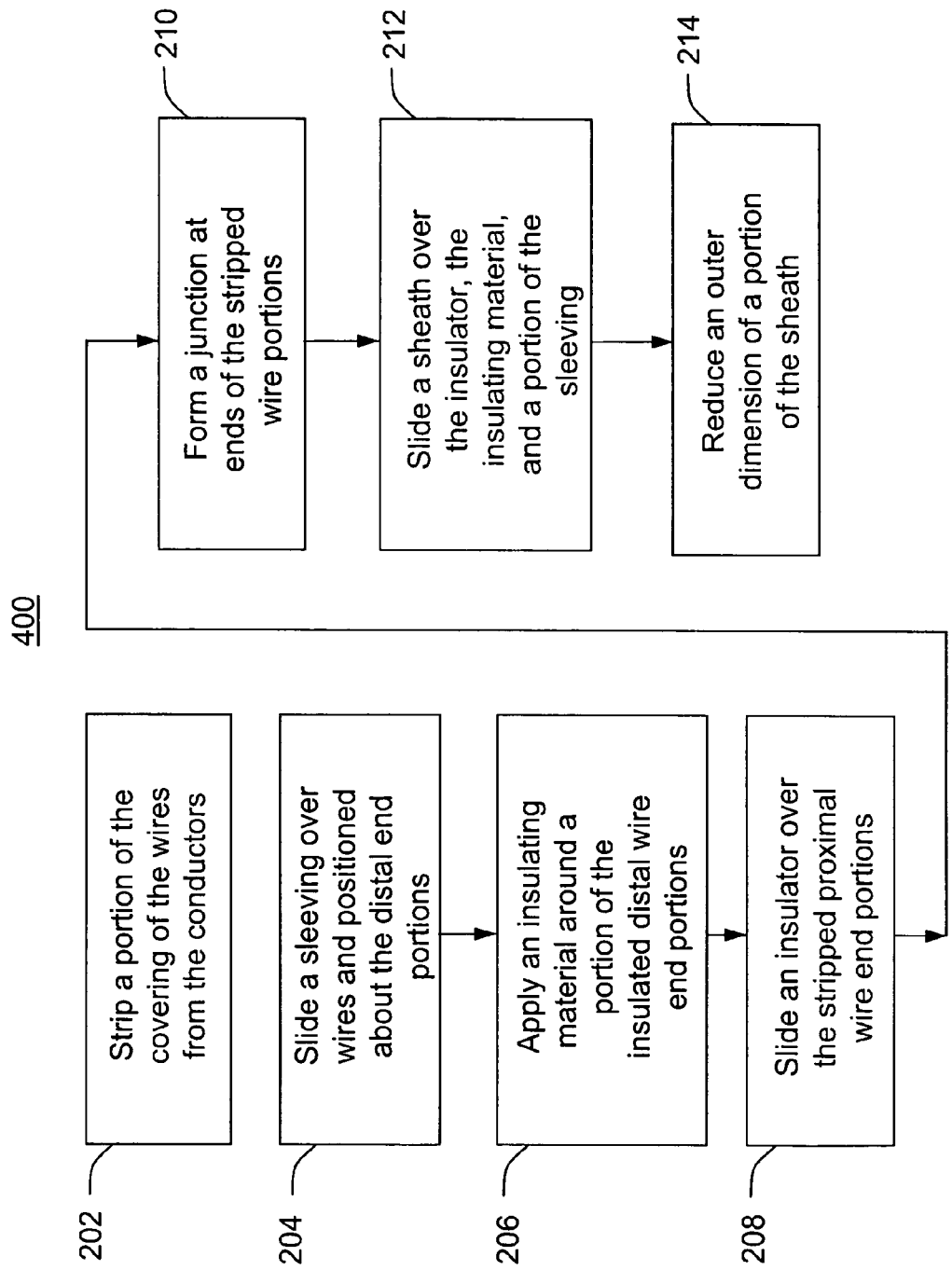
FIG. 4 is a flow chart illustrating a method of manufacturing a temperature sensor according to one exemplary embodiment.

As understood by those skilled in the art, various embodiments of the temperature sensors 100, 200 described in this disclosure are further described by the method of manufacture of the temperature sensor 100. In some embodiments and referring to FIG. 4, a flow chart 400 illustrates one exemplary manufacturing method for temperature sensors 100, 200. Manufacturing of the temperature sensors 100, 200, including a first wire 102A and a second wire 102B, begins in process 202 with stripping a portion of a covering 106 from a proximal end portion 108 of the first and second wires 102A and 102B to define insulated distal end portions 112 and stripped proximal end portions 108. In process 204, a sleeving 136 is slid over at least a portion of the insulated distal end portions of the first and second wires 102A and 102B. Next, an insulating material 134 is applied around at least a portion of the insulated distal end portions 112 of the first and second wires in process 206. An insulator 130 is slid over the stripped proximal end portions 108 of the first and second wires 102A and 102B and against the insulating material 134 in process 208. The insulator 130 can be a compactable preform having one or more cavities formed in the preform for receiving the first and second wires 102A and 102B.

In process 210, the method continues with forming a junction 118 at the proximal ends 114 of the stripped proximal end portions 108 of the first and second wires 102A and 102B. A sheath 122 is slid over the insulator 130, the insulating material 134, and at least a portion of the sleeving 136 in process 212. Finally, an outer dimension of at least a portion of the sheath 122 is reduced in process 214. In some embodiments, this reducing process includes reducing an outer dimension of the entire sheath 122 or forming a plurality of outer dimensions along the length of the sheath 122. In some embodiments, the method includes reducing a portion of the sheath 122 such that a portion of the sheath 122 engages a portion of the sleeving 136 and/or the wires 102.

Additional processes or variations of these processes can also be included in the manufacture of the temperature sensors 100, 200. For example, as described above, the insulating material 134 may be applied around at least a portion of the sleeving 136 to form the overlapping portion 138. In another embodiment, the sheath 122 is slid over only a portion of the sleeving 136 thereby leaving a portion of the sleeving 136 to extend beyond the open end 126 of the sheath 122 and about the wires 102. In this latter embodiment, the sleeving 136 acts, at least in part, as a strain relieve for the wires 102.

Of course, as understood by those skilled in the art, the wires of wire set 102 can first be formed with the covering 106, and in some cases, the wire set overcoat 107. In this embodiment, the method of manufacturing includes applying an insulating material as the covering to the first and second wires 102A and 102B prior to stripping the portion of the first and second wires 102A and 102B of the coverings 106.

As noted above, the insulating material 134 can include multiple portions of insulating material 134. In such embodiments, the method includes applying a first insulating material 134A around a portion of the sleeving 136 and a portion of the first and second wires 102A and 102B. Additionally, a second insulating material 134B may also be applied around the first and second wires 102A and 102B and adjacent to the insulator 130. In some embodiments, the second insulating material 134B is spaced apart from the first insulating material 134A to form the insulting gap 144 therebetween.

In one embodiment, the sheath 122 starts with having two open ends 126, wherein one of the open ends 126 is later closed to define the closed end 124. In this embodiment, the sheath 122 is slid over the wires of wire set 102 such that a portion of the stripped portions of the wires of wire set 102 extend from the insulator 130 and from the open proximal end of the sheath 122. After the junction 118 is formed by a suitable process, such as welding, soldering, and bonding, the open proximal end of the sheath 122 is closed by welding, soldering or any other suitable process. This can also include tapering an end portion of the sheath 122 and/or sanding an end portion of the sheath 122 proximate to the proximal end portion 108.

By manufacturing the temperature sensors 100, 200 by one or more of these processes, the temperature sensors 100, 200 are cost effectively produced to include a moisture barrier for reducing the amount of moisture exposed to the insulator 130 and to the proximal end 114 of the wire set 102. Additionally, with the above described manufacturing processes, the temperature sensors 100, 200 can be adaptable and flexibly applied within the desired temperature sensing applications. This can include, by way of example, mechanical bending or structural changes to the temperature sensors 100, 200 including to the sheath 122, without damaging the conducting, insulating or other structures within the temperature sensors 100, 200.

Figure 5:
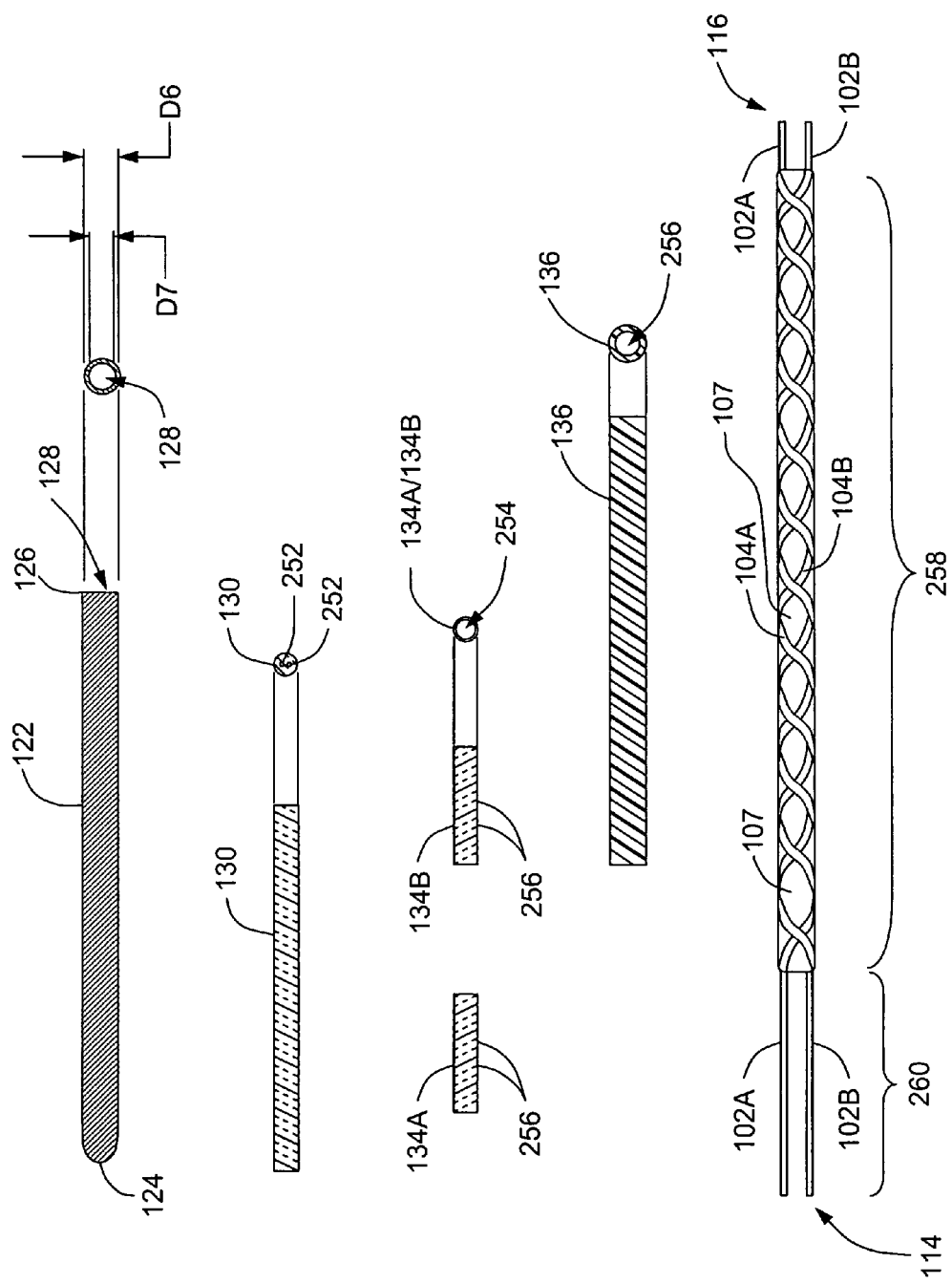
FIG. 5 is a side view illustrating unassembled parts for manufacturing a temperature sensor according to another exemplary embodiment.

FIGS. 5-6 provide a series of illustrations of various exemplary process phases during the manufacturing of some embodiments of a temperature sensor as described within this disclosure.

In FIG. 5, individual parts used in the manufacture of the temperature sensors 100, 200 are shown as an unassembled temperature sensor kit 500. At the top is the sheath 122 having the closed end 124 and the open end 126. The open end 126 defines an opening to the cavity 128. Generally, as shown in the end view, the sheath 122 can include a generally cylindrical outer shape, and as noted above, can be made of any material, and in one preferred embodiment, is made of a metal such as a stainless steel. The sheath 122 in the unassembled state generally has a initial outer dimension D6 and a cavity dimension D7. The sheath 122 has a cylindrical shape that includes the cavity 128 with an inner dimension D7 that is preferably greater than the outer dimension of the other temperature sensor components within the temperature sensor kit 500 as described below.

The insulator 130 also has a cylindrical outer shape. In this exemplary embodiment, the insulator 130 is a compactable preform composed of a preformed compactable insulating material such as magnesium oxide, silicon oxide, or aluminum oxide, by way of example. In this embodiment, the preform defines one or more insulator conductor channels 252 that are dimensioned for receiving the wire set 102 and/or one or more conductors 104. In this example, the insulator 130 has two conductor channels 252, with one dimensioned for receiving the first conductor 104A and the second dimensioned for receiving the second conductor 104B. In this case, the covering 106 has been removed from the conductors 104A and 104B of wire set 102.

Two separate insulating materials 134, shown as first insulating material 134A and second insulating material 134B, are composed of an insulating material as described above. In this example, the insulating material 134A and 134B are shown as tubes having cavities 254. Additionally, the insulating material 134A and 134B may be formed by wrapping, such as spiral wrapping, a tape or similar length of insulating material into a cylindrical form. Insulating materials 134A and 134B are illustrated having a plurality of spirally wrapped portions 256, however, it should be understood that insulating materials may have different forms such as a solid tube, by way of example.

The sleeving 136 can also have a cylindrical shape and define a sleeving cavity 256. As described above, the sleeving 136 can be composed of a variety of material. The sleeving 136 is composed, by way of example, of a braided fiberglass cylindrical tube. The wire set 102 includes the distal end 116 having a covered portion 258 wherein each wire of wire set 102 includes an outer covering 106. In this covered portion 258, the wire set 102 may also be twisted. A stripped portion 260 of the wire set 102 is generally at the proximal end 114. The stripped portion 260, the exposed and uncoated conductors 104A and 104B and generally includes non-twisted conductors 104, such as conductors 104 that have been straightened. While the wire set 102 is shown as including two wires 102A and 102B of the wire set 102 with two conductors 104, it should be understood that less or more wires 102A and 102B and conductors 104 can be provided and still be within the scope of the disclosure.

FIGS. 6A through FIG. 6K illustrate a process of manufacturing temperature sensors utilizing a temperature sensor kit similar to kit 500 of FIG. 5 according to some embodiments of the teachings of the present disclosure.

Figure 6A:
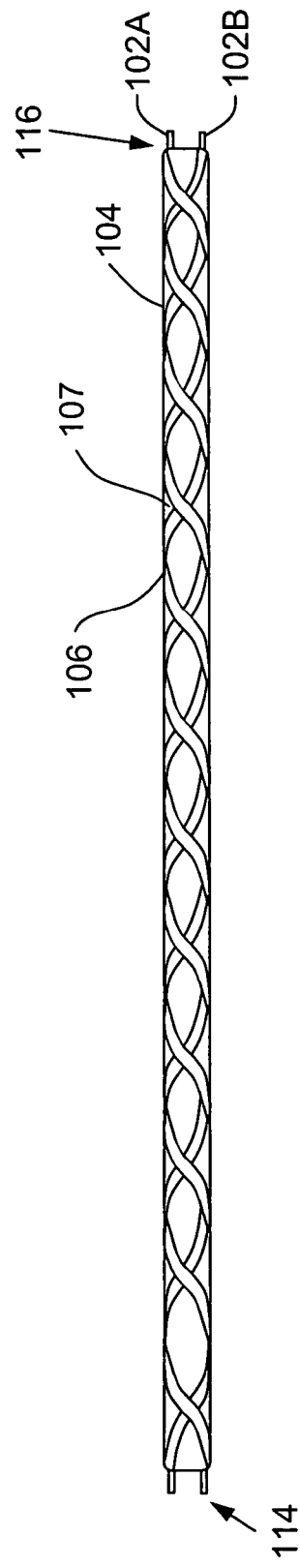
Figure 6B:
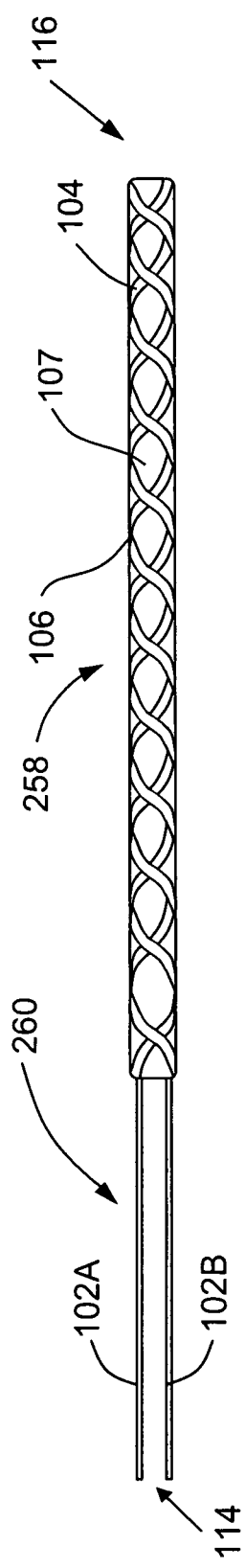
Figure 6C:
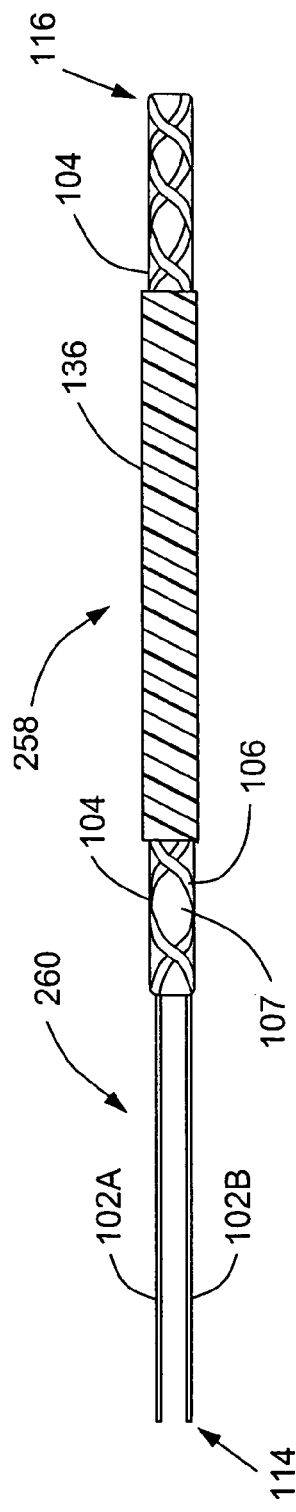
Figure 6D:
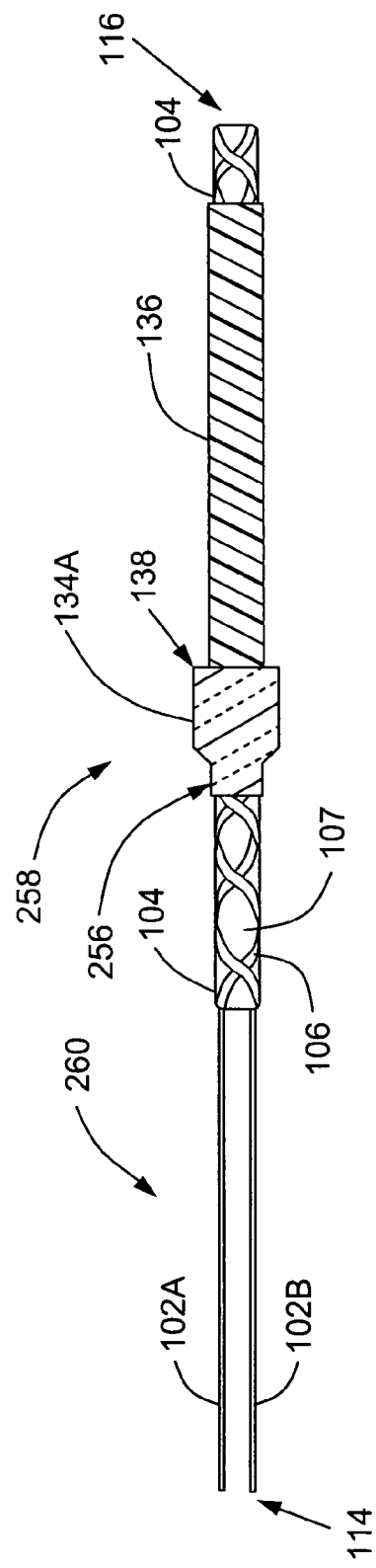
Figure 6E:
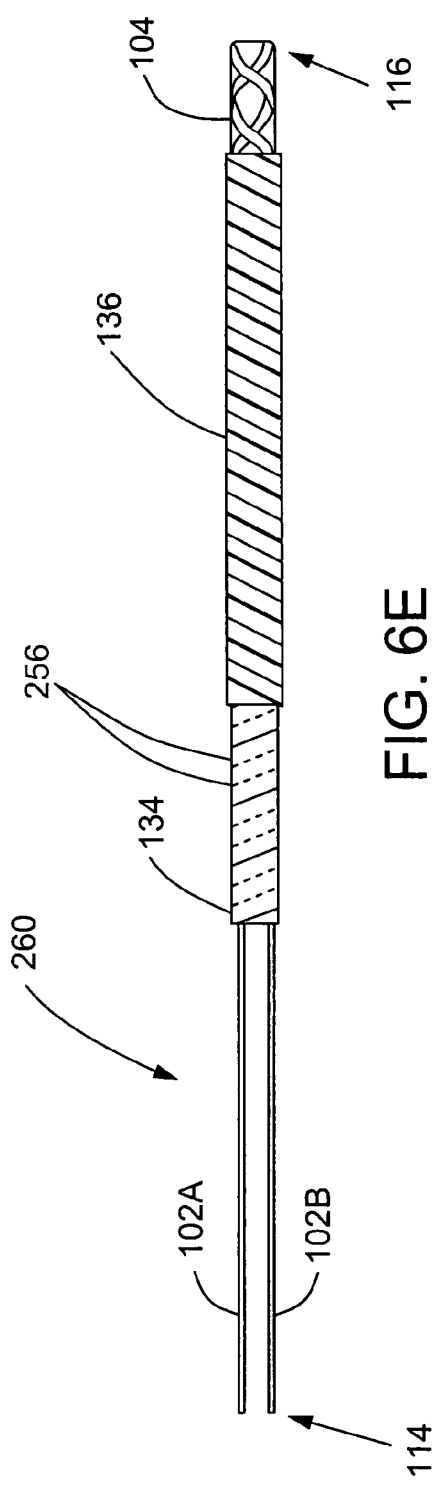

Referring first to FIG. 6A, the wire set 102 includes two conductors 104, the covering 106 and wire set overcoat 107. This includes the two conductors 104 being twisted along a longitudinal axis between the proximal end 114 and the distal end 116. The covering 106 and the wire set overcoat 107 are removed from the conductors 104 to expose conductors 104A and 104B and to define the stripped portion 260 and the covered portion 258 as shown in FIG. 6B. Next, the sleeving 136 is slid over the wire set 102 and positioned about the wire set over the covered portion 258 as shown in FIG. 6C. This is preferably at a distance from the stripped portion 260. The insulating material 134A is applied to the covered portion 258 of the wire set 102 between the sleeving 136 and the stripped portion 260. This insulating material 134A is preferably applied as a tape wound around the wire set 102 as shown in FIG. 6D. This can include winding a portion of the insulating material 134 about a portion of the sleeving 136 such as the overlapping portion 138 illustrated in FIG. 6D. The insulating material 134A is positioned and applied to, at least in part, secure and/or position the sleeving 136 at a predefined distance from the stripped portion 260 and the exposed conductors 104. Securing the sleeving in this manner, the next assembly processes are simplified. The position of the insulating material 134 can include leaving a space from the stripped portion 260 as shown in FIG. 6D. In another embodiment, FIG. 6E illustrated the insulating material 134A positioned to cover the entire portion of the covered portion 258 of the wire set 102 located between the sleeving 136 and the stripped portion 260. FIG. 6E also illustrates that, in some embodiments, the insulating material 134A does not overlap the sleeving 136. Rather the insulating material 134A is positioned against an end of the sleeving 136 to maintain the position of the sleeving 136 relative to the stripped portion 260, and not to secure the sleeving 136. This embodiment can also aid in the assembly process, even though the sleeving 136 is not secured by the insulating material 134.

Figure 6F:
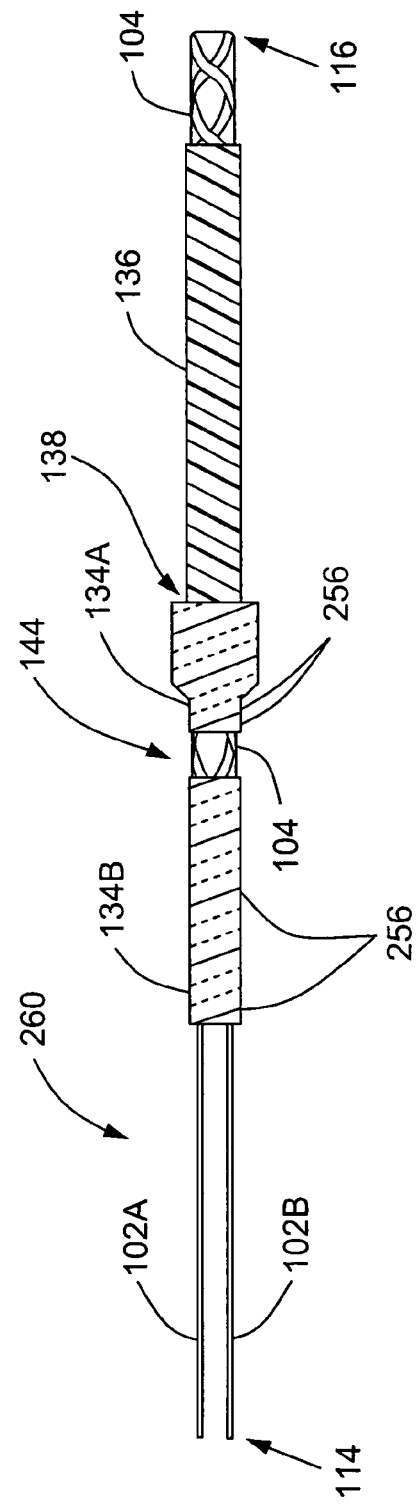

In some embodiments, as shown in FIG. 6F, an additional or second insulating material 134B can be added in the case where the insulating material 134A is not positioned to cover the entire covered portion 258 of the wire set 102 between the sleeving 136 and the stripped portion 260. The second insulating material 134B can be wrapped about the wire set 102 up to the demarcation point between the covered portion 258 and the stripped portion 260. In this manner, the second insulating material 134B can aid in the positioning of the insulator 130 (as shown in the next step in FIG. 6G). The second insulating material 134B can also be spaced apart from the first insulating material 134A to create the insulating gap 144 between the two insulating materials 134A and 134B. This can provide one or more advantages over prior practice by improving the assembly process, reducing material costs, and creating the insulating gap 144. As noted, the insulating gap 14 provides an internal compartment for heat dissipation and structure flexibility, e.g., enables the bending of the sheath 122 of the assembled temperature sensor 100 without internal stress caused by compression and stretching of the insulating material 134 in the region between the insulator 130 and the sleeving 136. Next, each conductor 104A and 104B is positioned within the conductor channels 252 of the insulator 130. The insulator 130 is then slid over the conductors 104 as shown in FIG. 6G. The insulator 130 can be slid to the end of the stripped portion 260 and/or up against one of the insulating materials 134A, 134B.

Referring now to FIG. 6H, the junction 118 is formed. FIG. 6H illustrates the formation of a thermocouple formed by the coupling of proximal end 114 of conductors 104A and 104B to form one temperature sensing element 120. However, as noted above, in other embodiments the junction 118 can include the coupling of conductors 104 to another type of temperature sensing element 120, such as a thermistor or an RTD, by way of example. After the junction 118 is formed, the sheath 122 is slid over the junction 118, the proximal ends 114 of wire set 102, the insulator 130, the insulated material(s) 134 and, at least a portion of, the sleeving 136 as shown in FIG. 6I. The sheath 122 has the initial outer dimension of D5. In the next process as shown in FIG. 6J, the outer dimension of a portion of the sheath 122 nearest the proximal end 114 is decreased to dimension D1. In this manner, the insulator 130 is crushed and compacted about the conductors 104A and 104B and about the insulating material 134 about covered portion 258. Additionally, a portion of the sleeving 136 can also be compressed by reduction in the outer dimension of the sheath 122. The entire length of sheath 122 can have a reduced outer dimension D1 or in some embodiments, a portion of the sheath 122 can retain the initial dimension D5, or can be reduced to a different dimension D2, which can be larger or smaller than dimension D1. In these embodiments, the sheath transition portion 140 is formed along the length of the sheath 122.

In some embodiments, the overall length of the sheath 122 after outer dimension reduction can be such as to enable a portion of the sleeving 136 to extend beyond the sheath 122. This reduction process is described in greater detail above. In this manner, the sleeving 136 can not only provide for sealing and insulating, the extended portion can also provide strain relief to the wire set 102 about the sheath open end 126.

In some embodiments, a portion of the sheath 122 about the sleeving 136 can also be reduced or otherwise modified to create the reduction 142. As noted above, the additional reduction 142 of the sheath 122 about the sleeving 136 can secure the sleeving 136 within the sheath cavity 128 as illustrated in FIG. 6K.

While not illustrated in the figures of FIG. 6, thereafter, the temperature sensors 100, 200 or portions thereof, can be sanded, bent, twisted or otherwise modified for a particular temperature sensing application. For example, in some embodiments the closed end 124, or a portion thereof is tapered. Such additional dimension reduction or tapering can also improve the time response of the temperature sensing operation of the temperature sensor 100, 200.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A temperature sensor comprising:
   a first wire having a proximal end portion defining a proximal end, a distal end portion, an intermediate portion, and a covering;
   a second wire having a proximal end portion defining a proximal end, a distal end portion defining a proximal end, an intermediate portion, and a covering;
   a junction disposed at the proximal ends of the first and second wires;
   a wire set overcoat that binds the first and second wires together;
   an insulator surrounding and in contact with a portion of the proximal end portions of the first and second wires;
   an insulating material surrounding the wire set overcoat adjacent the insulator, the insulating material being positioned as an intermediate stop to properly position the insulator during assembly of the temperature sensor;
   a sleeving surrounding the wire set overcoat and at least a portion of the intermediate portions of the first and second wires and positioned adjacent the insulating material, opposite the insulator, the sleeving acting, at least in part, as a strain relief for the first and second wires; and
   a sheath disposed around the proximal ends of the first and second wires, the insulator, the insulating material, and at least a portion of the sleeving,
   wherein the wire set overcoat extends through the insulating material and the sleeving.

2. The temperature sensor of claim 1 wherein the sheath has a closed end and an open end, the junction being positioned proximate to the closed end, and the sleeving being positioned proximate to the open end.

3. The temperature sensor of claim 2 wherein the sheath includes a first outer dimension and a second outer dimension, the second outer dimension being greater than the first outer dimension, and the sheath proximate to the open end having the second outer dimension and the sheath around the insulator having the first outer dimension.

4. The temperature sensor of claim 3 wherein the sheath includes a tip tapered from the first outer dimension to a third outer dimension proximate to an end of the sheath proximate to the proximal ends of the first and second wires, the third dimension being smaller than the first outer dimension and the second outer dimension.

5. The temperature sensor of claim 3 wherein the sheath includes a transition portion of multiple outer dimensions between the first outer dimension and the second outer dimension.

6. The temperature sensor of claim 2 wherein the sleeving is positioned proximate to the open end of the sheath and at least partially extends from the open end.

7. The temperature sensor of claim 1 wherein the sheath includes a reduced portion securing the sleeving and the first and second wires within the sheath.

8. The temperature sensor of claim 1 wherein the covering of the first wire and the second wire include polyimide.

9. The temperature sensor of claim 1 wherein the sleeving is flexible.

10. The temperature sensor of claim 1 wherein the sleeving includes a fiberglass.

11. The temperature sensor of claim 1 wherein the sleeving includes a braided insulating material.

12. The temperature sensor of claim 1 wherein the insulator includes an insulating material selected from the group consisting of magnesium oxide, silicon oxide, and aluminum oxide.

13. The temperature sensor of claim 1 wherein the insulator includes a compressed powder insulating material.

14. The temperature sensor of claim 1 wherein the portions of the first and second wires surrounded by the insulator exclude the coverings.

15. The temperature sensor of claim 1 wherein the insulating material includes a polyimide tape wrapped around the first and second wires.

16. The temperature sensor of claim 1 wherein the insulating material is a first insulating material, further comprising a second insulating material surrounding the first and second wires, the first insulating material being positioned proximate to the insulator and the second insulating material being positioned proximate to the sleeving, the second insulating material being spaced apart from the first insulating material thereby forming a gap therebetween.

17. A temperature sensor comprising:
a first wire having a proximal end portion defining a proximal end, a distal end portion, an intermediate portion, and a covering;
a second wire having a proximal end portion defining a proximal end, a distal end portion defining a proximal end, an intermediate portion, and a covering;
a wire set overcoat that binds the first wire and the second wire together;
an insulator surrounding and in contact with a portion of the proximal end portions of the first and second wires;
an insulating material surrounding the wire set overcoat adjacent the insulator, the insulating material being positioned as an intermediate stop to properly position the insulator during assembly of the temperature sensor;
a sleeving surrounding the wire set overcoat and at least a portion of the intermediate portions of the first and second wires and positioned adjacent the insulating material, opposite the insulator such that the sleeving is in direct contact with the insulating material; and
a sheath disposed around the proximal ends of the first and second wires, the insulator, the insulating material, and at least a portion of the sleeving,
wherein the wire set overcoat extends through the insulating material and the sleeving.

18. The temperature sensor of claim 17 wherein the sheath includes a first outer dimension and a second outer dimension, the second outer dimension being greater than the first outer dimension, and an open end of the sheath having the second outer dimension and a portion of the sheath around the insulator having the first outer dimension.

19. The temperature sensor of claim 18 wherein the sheath includes a tip tapered from the first outer dimension to a third outer dimension proximate to an end of the sheath proximate to the proximal ends of the first and second wires, the third dimension being smaller than the first outer dimension and the second outer dimension.

20. The temperature sensor of claim 18 wherein the sheath includes a transition portion of multiple outer dimensions between the first outer dimension and the second outer dimension.

21. The temperature sensor of claim 17 wherein the sleeving is positioned proximate an open end of the sheath and at least partially extends from the open end.

22. The temperature sensor of claim 17 wherein the sleeving is flexible.

23. The temperature sensor of claim 17 wherein the insulating material is a polyimide tape.

24. The temperature sensor of claim 17 wherein the insulating material is a first insulating material, further comprising a second insulating material surrounding the first and second wires, the first insulating material being positioned proximate to the insulator and the second insulating material being positioned proximate to the sleeving, the second insulating material being spaced apart from the first insulating material thereby forming a gap therebetween.

25. A temperature sensor comprising:
a first wire having a proximal end portion defining a proximal end, a distal end portion, an intermediate portion, and a covering;
a second wire having a proximal end portion defining a proximal end, a distal end portion defining a proximal end, an intermediate portion, and a covering;
a wire set overcoat that binds the first wire and the second wire together;
an insulator surrounding and in contact with a portion of the proximal end portions of the first and second wires;
an insulating material in the form of a polyimide tape surrounding the wire set overcoat and the first and second wires adjacent the insulator, the polyimide tape being positioned as an intermediate stop to properly position the insulator during assembly of the temperature sensor;
a sleeving surrounding the wire set overcoat and at least a portion of the intermediate portions of the first and second wires and positioned adjacent the polyimide tape, opposite the insulator; and
a sheath disposed around the proximal ends of the first and second wires, the insulator, the insulating material, and at least a portion of the sleeving
wherein the wire set overcoat extends through the insulating material and the sleeving.

26. The temperature sensor of claim 25 wherein the sheath includes a first outer dimension and a second outer dimension, the second outer dimension being greater than the first outer dimension, and an open end of the sheath having the second outer dimension and a portion of the sheath around the insulator having the first outer dimension.

27. The temperature sensor of claim 25 wherein the sheath includes a tip tapered from the first outer dimension to a third outer dimension proximate to an end of the sheath proximate to the proximal ends of the first and second wires, the third dimension being smaller than the first outer dimension and the second outer dimension.

28. The temperature sensor of claim 25 wherein the sheath includes a transition portion of multiple outer dimensions between the first outer dimension and the second outer dimension.

29. The temperature sensor of claim 25 wherein the sleeving is positioned proximate an open end of the sheath and at least partially extends from the open end.

30. The temperature sensor of claim 25 wherein the insulating material is a first insulating material, further comprising a second insulating material surrounding the first and second wires, the first insulating material being positioned proximate to the insulator and the second insulating material being positioned proximate to the sleeving, the second insulating material being spaced apart from the first insulating material thereby forming a gap therebetween.

31. A temperature sensor comprising:
a first wire having a proximal end portion defining a proximal end, a distal end portion, an intermediate portion, and a covering;
a second wire having a proximal end portion defining a proximal end, a distal end portion defining a proximal end, an intermediate portion, and a covering;
a wire set overcoat that binds the first wire and the second wire together;

an insulator surrounding and in contact with a portion of the proximal end portions of the first and second wires;

an insulating material surrounding the wire set overcoat and the first and second wires adjacent the insulator, the insulating material being positioned as an intermediate stop to properly position the insulator during assembly of the temperature sensor;

a sleeving surrounding the wire set overcoat and at least a portion of the intermediate portions of the first and second wires and positioned adjacent the insulating material, opposite the insulator; and a sheath disposed around the proximal ends of the first and second wires, the insulator, the insulating material, and at least a portion of the sleeving, wherein the sheath is compressed about the insulator, the insulating material, and the portion of the sleeving for positioning of the insulator, the insulating material, and the portion of the sleeving, wherein the wire set overcoat extends through the insulating material and the sleeving.

32. The temperature sensor of claim 31 wherein the sheath includes a first outer dimension and a second outer dimension, the second outer dimension being greater than the first outer dimension, and an open end of the sheath having the second outer dimension and a portion of the sheath around the insulator having the first outer dimension.

33. The temperature sensor of claim 31 wherein the sheath includes a tip tapered from the first outer dimension to a third outer dimension proximate to an end of the sheath proximate to the proximal ends of the first and second wires, the third dimension being smaller than the first outer dimension and the second outer dimension.

34. The temperature sensor of claim 31 wherein the sheath includes a transition portion of multiple outer dimensions between the first outer dimension and the second outer dimension.

35. The temperature sensor of claim 31 wherein the sleeving is positioned proximate an open end of the sheath and at least partially extends from the open end.

36. The temperature sensor of claim 31 wherein the insulating material is a first insulating material, further comprising a second insulating material surrounding the first and second wires, the first insulating material being positioned proximate to the insulator and the second insulating material being positioned proximate to the sleeving, the second insulating material being spaced apart from the first insulating material thereby forming a gap therebetween.

* * * * *